United States Patent
Wang

(10) Patent No.: US 11,143,522 B2
(45) Date of Patent: Oct. 12, 2021

(54) TRAVEL TIME PREDICTION METHOD, APPARATUS AND SERVER

(71) Applicant: Tencent Technology (Shenzhen) Company Limited, Shenzhen (CN)

(72) Inventor: Gangwei Wang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 316 days.

(21) Appl. No.: 16/294,393

(22) Filed: Mar. 6, 2019

(65) Prior Publication Data
US 2019/0204102 A1    Jul. 4, 2019

Related U.S. Application Data

(63) Continuation of application No. PCT/CN2017/101448, filed on Sep. 12, 2017.

(30) Foreign Application Priority Data

Oct. 13, 2016  (CN) .......................... 201610893915.9

(51) Int. Cl.
*G01C 21/34*  (2006.01)
*G01C 21/36*  (2006.01)
(Continued)

(52) U.S. Cl.
CPC ..... *G01C 21/3492* (2013.01); *G01C 21/3691* (2013.01); *G01C 21/3697* (2013.01); *G08G 1/01* (2013.01); *G08G 1/096833* (2013.01)

(58) Field of Classification Search
CPC ........ G01C 21/34; G01C 21/20; G01C 21/24; G01C 21/3492; G01C 21/3691;
(Continued)

(56) References Cited

U.S. PATENT DOCUMENTS 9,349,285 B1 *  5/2016  Fowe .................. G08G 1/0141
9,564,048 B2     2/2017  Liu et al.
(Continued)

FOREIGN PATENT DOCUMENTS

CN        101636771        1/2010
CN        101706888        5/2010
(Continued)

OTHER PUBLICATIONS

The Bus Travel Time Prediction Based on Bayesian Networks; Lingli Deng;Zhaocheng He;Renxin Zhong; 2013 International Conference on Information Technology and Applications; IEEE Conference Paper. (Year: 2013).*

(Continued)

*Primary Examiner* — Cuong H Nguyen
(74) *Attorney, Agent, or Firm* — Oblon, McClelland, Maier & Neustadt, L.L.P.

(57) ABSTRACT

A method and an apparatus for estimating travel time are provided. A request, via interface circuitry of the apparatus, is obtained to estimate the travel time of a target travel route from a starting point to an end point. The apparatus subsequently obtains, via the interface circuitry, road traffic information along the target travel route at a current time. The estimated travel time of the target travel route is calculated by processing circuitry of the apparatus according to the obtained road traffic information and historical travel data. The historical travel data includes a plurality of historical travel routes, respective road traffic information for each of the plurality of historical travel routes, and a respective actual travel time of each of the plurality of historical travel routes.

20 Claims, 4 Drawing Sheets

(51) Int. Cl.
*G08G 1/01* (2006.01)
*G08G 1/0968* (2006.01)

(58) Field of Classification Search
CPC ....... H04W 4/021; H04W 4/02; H04W 4/024; G08G 1/01; G08G 1/0129; G08G 1/096833
USPC .................................. 701/410, 465, 117–118
See application file for complete search history.

(56) References Cited

U.S. PATENT DOCUMENTS

| | | | |
|---|---|---|---|
| 10,876,841 B2* | 12/2020 | Mase .................... | G08G 5/0026 |
| 2011/0178702 A1 | 7/2011 | Lassesson et al. | |
| 2014/0012469 A1* | 1/2014 | Kunihiro ................ | B62D 6/001 |
| | | | 701/41 |
| 2015/0241242 A1* | 8/2015 | Rings ..................... | G01C 21/20 |
| | | | 701/465 |
| 2015/0253144 A1* | 9/2015 | Rau ...................... | G01C 21/3484 |
| | | | 705/348 |
| 2016/0155325 A1* | 6/2016 | Fowe .................... | G08G 1/0133 |
| | | | 701/117 |
| 2018/0274929 A1* | 9/2018 | Mase ..................... | G01C 21/20 |
| 2020/0143691 A1* | 5/2020 | Sidiropoulos .... | G06Q 10/06393 |
| 2020/0273268 A1* | 8/2020 | Bhattacharyya ............................ | |
| | | | H04L 12/40169 |

FOREIGN PATENT DOCUMENTS

| | | |
|---|---|---|
| CN | 101794512 | 8/2010 |
| CN | 1 021 871 77 A | 9/2011 |
| CN | 103377552 | 10/2013 |
| CN | 105006147 A | 10/2015 |
| CN | 105551239 | 5/2016 |
| JP | 2007011596 | 1/2007 |

OTHER PUBLICATIONS

Bus arrival time prediction model based on APC data; Shaowu Cheng;Baoyi Liu;Botao Zhai; 6th Advanced Forum on Transportation of China (AFTC 2010) ; IETConference Paper. (Year: 2010).*
An effective method to estimate urban link travel time in real-time traffic information system; Bowen Du et al; 2009 1st International Conference on Wireless Communication, Vehicular Technology, Information Theory and Aerospace & Electronic Systems Technology; IEEE Conference Paper. (Year: 2009).*
Travel Time Estimation Using Speed Predictions; Aditya Narayanan-;Nikola Mitrovic;Muhammad Tayyab Asif;Justin Dauwels;Patrick Jaillet; 2015 IEEE 18th International Conference on Intelligent Transportation Systems; IEEE Conference Paper (Year: 2015).*
Office Action dated Jul. 5, 2019 in Chinese Patent Application No. 201610893915.9, with partial English translation.
International Search Report dated Dec. 14, 2017 in International Application No. PCT/CN2017/101448(with English translation.).
Written Opinion dated Dec. 14, 2017 in International Application No. PCT/CN2017/101448.

* cited by examiner

TRAVEL TIME PREDICTION METHOD, APPARATUS AND SERVER

RELATED APPLICATION

This application is a continuation of International Application No. PCT/CN2017/101448, filed on Sep. 12, 2017, which claims priority to Chinese Patent Application No. 201610893915.9, entitled "TRAVEL TIME PREDICTION METHOD AND APPARATUS" filed on Oct. 13, 2016. The entire disclosures of the prior applications are hereby incorporated by reference in their entirety.

FIELD OF THE TECHNOLOGY

The present disclosure relates to the field of computer technologies.

BACKGROUND OF THE DISCLOSURE

Travel time is a duration required from a starting point to an end point of a certain route. Currently, travel time prediction is widely used in multiple actual application scenarios, for example, arrival moment prediction, route recommendation, or order assignment.

A manner for predicting a travel time is as follows: a server receives a travel time prediction request, and the travel time prediction request is used for requesting to estimate a travel time of a target travel route; the server divides the target travel route in accordance to a road section, and separately estimates a travel time of a vehicle on each road section according to a length of each road section and a travel speed on each road section at a current moment; the server estimates a moment that the vehicle arrives at each intersection according to the travel time on each road section, and determines a wait time that the vehicle waits at each intersection; afterwards, the server accumulates estimated time periods of all parts to obtain an estimated travel time of the target travel route.

Using the foregoing solution, a travel speed on each road section and that is used by the server can not accurately reflect a travel speed that the vehicle actually has on the road section. Therefore, an estimated travel time on each road section is not accurate, and this further affects accuracy of an estimated wait time on each road section. Moreover, errors of estimated time periods of all parts are continuously accumulated, so that accuracy of a finally obtained prediction result is relatively low.

SUMMARY

To resolve the problem that accuracy of travel time prediction in related technologies is low, embodiments of this application provide a travel time prediction method and apparatus. The technical solutions are as follows:

According to a first aspect, a method and an apparatus for estimating travel time are provided. A request, via interface circuitry of the apparatus, is obtained to estimate the travel time of a target travel route from a starting point to an end point. The apparatus subsequently obtains, via the interface circuitry, road traffic information along the target travel route at a current time. The estimated travel time of the target travel route is calculated by processing circuitry of the apparatus according to the obtained road traffic information and historical travel data. The historical travel data includes a plurality of historical travel routes, respective road traffic information for each of the plurality of historical travel routes, and a respective actual travel time of each of the plurality of historical travel routes.

In an embodiment of the disclosed method, the calculating includes feeding the road traffic information as an input to a travel time calculation model and applying the travel time calculation model to calculate the estimated travel time of the target travel route. The travel time calculation model is obtained through training based on the historical travel data.

In an embodiment, a plurality of training samples is built based on the historical travel data. Each of the plurality of training samples includes a first one of the plurality of historical travel routes, the road traffic information for the first one of the plurality of historical travel routes, and an actual travel time of the first one of the plurality of historical travel routes. The plurality of training samples is trained by using a machine learning algorithm to obtain the travel time calculation model.

In an embodiment, a plurality of verification samples is also built based on the historical travel data. Each of the plurality of verification samples includes a second one of the plurality of historical travel routes, the road traffic information for the second one of the plurality of historical travel routes, and the actual travel time of the second one of the plurality of historical travel routes. The plurality of verification samples is different from the plurality of training samples. In the disclosed method, for each of the plurality of verification samples, the respective road traffic information for the respective verification sample is fed as an input to the travel time calculation model, and the travel time calculation model is applied to calculate a respective estimated travel time of the respective verification sample. Further, a quality evaluation parameter of the travel time calculation model is calculated based on the respective actual travel time and the respective estimated travel time of each of the plurality of the verification samples. The quality evaluation parameter indicates a prediction accuracy of the travel time calculation model. Next, whether the quality evaluation parameter satisfies a preset condition is detected. The plurality of training samples are adjusted when the quality evaluation parameter does not satisfy the preset condition, and the adjusted plurality of training samples are trained by using the machine learning algorithm to obtain another travel time calculation model.

In an embodiment of the disclosed method, the calculating the quality evaluation parameter includes, for each of the plurality of the verification samples, calculating an error rate based on the respective actual travel time and the respective estimated travel time of the respective verification sample. Further, a ratio between a number of the plurality of verification samples that have error rates less than a first threshold value and a total number of the plurality of verification samples is obtained. The ratio is defined as the quality evaluation parameter. In the disclosed method, the preset condition includes a condition that the ratio is greater than a second threshold value.

In an embodiment, the method further includes performing transformation processing on the road traffic information, and obtaining processed road traffic information. The calculating includes calculating the estimated travel time of the target travel route according to the processed road traffic information and the historical travel data.

In another embodiment, the method includes calculating an estimated arrival moment based on a planned departure moment and the estimated travel time of the target travel route.

In another embodiment, the method includes calculating an estimated departure moment based on a planned arrival moment and the estimated travel time of the target travel route.

In yet another embodiment, the method includes calculating the estimated travel time of the target travel route without separately estimating travel times of a plurality of different roads along the target travel route.

According to another aspect, a non-transitory computer readable storage medium is provided. The medium stores instructions which when executed by at least one processors cause the at least one processor to perform the method for estimating travel time which is mentioned above.

Beneficial effects of the technical solutions according to the embodiments of this application include:

When an estimated travel time of a target travel route is predicted, in addition to a whole route feature (or road traffic information) corresponding to the target travel route, a prediction result is corrected by using historical travel data with reference to the historical travel data, so that accuracy of the prediction result obtained through calculation is increased. In addition, a corresponding whole route feature (or road traffic information) is directly obtained according to the target travel route that is a whole travel route, and section processing does not need to be performed on the target travel route, so that an accumulated error caused by a section accumulation may be avoided, thereby increasing accuracy of the prediction result.

BRIEF DESCRIPTION OF THE DRAWINGS

To describe the technical solutions of the embodiments of the present disclosure more clearly, the following briefly introduces the accompanying drawings required for describing the embodiments. The accompanying drawings in the following description show merely some embodiments of the present disclosure, and a person of ordinary skill in the technology may still derive other drawings from these accompanying drawings.

DESCRIPTION OF EMBODIMENTS

To make the objectives, technical solutions, and advantages of the present disclosure clearer, the following further describes implementations of the present disclosure in detail with reference to the accompanying drawings.

In embodiments of this application, travel time is a duration required from a starting point to an end point of a certain route. An actual travel time is an actually consumed travel time obtained according to related historical travel data. That is, the actual travel time is a true value. An estimated travel time is an estimated to-be-consumed travel time obtained through calculation according to a whole route feature corresponding to a target travel route and the historical travel data. That is, the estimated travel time is a predictive value. The estimated travel time may be referred to as an estimated time of arrival (ETA).

In addition, technical solutions according to the embodiments of this application are mainly applied to predicting a travel time of a vehicle. For example, generally, the vehicle may be a car; and in other possible cases, the vehicle may also be an electric vehicle, a motorcycle, a bicycle, or another vehicle.

In the method according to the embodiments of this application, an execution body of all steps may be a server. For example, the server may be one server, or a server cluster formed by multiple servers, or a cloud computing center.

Optionally, the server is connected to a terminal through a wireless network and is configured to receive a historical travel record reported by the terminal. In addition, the server is connected to a server of a traffic management department through a wired or wireless network and is configured to obtain real-time data of a road traffic status. The terminal is a navigation device disposed in a vehicle, a mobile terminal having a navigation function or a car machine installed in the vehicle. Historical travel data of the historical travel record includes a historical travel route, a whole route feature corresponding to the historical travel route and an actual travel time of the historical travel route. Subsequently, the server predicts an estimated travel time of a travel route based on the historical travel data and real-time data of the road traffic status reported by massive terminals.

For ease of description, in the following method embodiment, an example in which a server is used as the execution body of all the steps is used for description.

Figure 1:
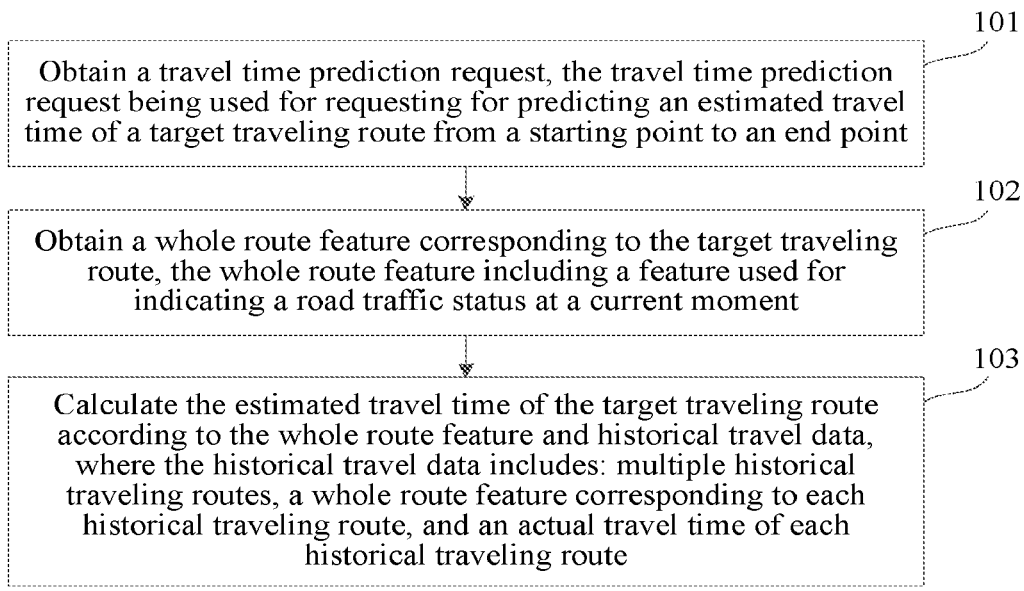
FIG. 1 is a flowchart of a travel time prediction method (or method for estimating travel time) according to an embodiment of the present disclosure.

Referring to FIG. 1, FIG. 1 shows a flowchart of a travel time prediction method according to an embodiment of this application. The method may include the following steps:

Step 101: Obtain a travel time prediction request, the travel time prediction request being used for requesting for predicting an estimated travel time of a target travel route from a starting point to an end point.

A server obtains the travel time prediction request. For example, the server receives a travel time prediction request sent by a terminal. The target travel route may be a set travel route customized by a user, or may be a travel route planned and generated by the terminal according to a route planning condition (such as a starting point and an end point) set by the user.

Step 102: Obtain a whole route feature corresponding to the target travel route, the whole route feature including a feature used for indicating a road traffic status at a current moment (or current time).

After obtaining the travel time prediction request, the server obtains the whole route feature corresponding to the target travel route according to the road traffic status of the target travel route at a current moment. The current moment means the moment that the server performs the step of obtaining the whole route feature corresponding to the target travel route. The server may connect to a database of the traffic management department, and obtain related data of the road traffic status from the database of the traffic management department.

The feature for indicating the road traffic status at a current moment may be referred to as a real-time road condition feature, and the real-time road condition feature includes but is not limited to at least one of the following: a ratio of a length roads in each traffic state (for example, very congested, congested, slow, and free-flowing) to a total length of a travel route, a travel speed of a vehicle on each road at a current moment, a speed limit of the vehicle on each road at the current moment. The roads may be divided with reference to different criteria, such as an administrative level (for example, a highway, an expressway, a national highway, a provincial road, and a county road), a function grade (for example, an expressway, a trunk road, a secondary trunk road, and a branch road), a road type (for example, a common road, a road that an up line and a down line are separate, a tunnel, a main road, a subsidiary road, a roundabout, a bridge, and a ramp), a direction of traffic flow (for example, a one-way traffic and a two-way traffic), a construction condition (for example, under construction and under no construction), a passing condition (for example, no passing and passing is allowed), a quantity of lanes (for example, one lane, two lanes, three lanes, more than three lanes), whether it is a viaduct, or a slope (for example, an uphill road and a downhill road).

Optionally, the whole route feature further includes a feature that is used for indicating a basic attribute of a route and that may be referred to as a route static feature. The route static feature includes but is not limited to at least one of the following: a road length ratio, a traffic facility density, a total length of a travel route, an actual departure moment/period/date, or an actual arrival moment/period/date.

For example, a road length ratio includes but is not limited to at least one of the following: a ratio of a length of roads of each administrative level to a total length of a travel route; a ratio of a length of roads of each function grade to a total length of a travel route; a ratio of a length of roads of each road type to a total length of a travel route; a ratio of a length of roads of each traffic flow to a total length of a travel route; a ratio of a length of a road under construction and/or a road under no construction to a total length of a travel route; a ratio of a length of a road indicating no passing and/or a length of a road indicating that passing is allowed to a total length of a travel route; a ratio of a length of a road having different lanes to a total length of a travel route; a ratio of a length of a viaduct to a total length of a travel route; a ratio of a length of an uphill road and/or downhill road to a total length of a travel route.

The traffic facility density includes but is not limited to at least one of the following: a ratio of a quantity of traffic lights to a total length of a travel route, a quantity of toll stations to a total length of a travel route, a quantity of cameras to a total length of a travel route, and a ratio of each intersection (for example, a confluence intersection, and a shunt intersection) of different types to a total length of a travel route.

The features described above are merely exemplary and explanatory, and are not intended to limit this application. In an actual application, a large quantity of features related to the travel time may be set, to represent regular changes of the travel time better.

In this embodiment of this application, section processing does not need to be performed on the target travel route, and a corresponding whole route feature is directly obtained according to the target travel route that is a whole travel route, so that an accumulated error caused by a section accumulation may be avoided.

Step 103: Calculate the estimated travel time of the target travel route according to the whole route feature and historical travel data, where the historical travel data includes: multiple historical travel routes, a whole route feature corresponding to each historical travel route, and an actual travel time of each historical travel route.

In this embodiment of this application, when a server predicts an estimated travel time of the target travel route, in addition to the whole route feature corresponding to the target travel route, a prediction result is corrected by using the historical travel data with reference to the historical travel data, so that accuracy of the prediction result obtained by calculation is increased. For example, a preset data processing algorithm may be used for performing processing on the whole route feature corresponding to the target travel route and the historical travel data, to obtain an estimated travel time of the target travel route through calculation. For another example, a travel time calculation model may be built according to the historical travel data, and an estimated travel time of the target travel route may be obtained through calculation according to the whole route feature corresponding to the target travel route by using the travel time calculation model.

In a possible implementation, a server receives the historical travel records reported by massive terminals, and extracts historical travel data included in all the historical travel records. The historical travel data is obtained during an actual travel process of a vehicle, so that accuracy of the obtained estimated travel time based on the historical travel data is higher.

In another possible implementation, a server records each travel route and a corresponding actual travel time, and uses the travel route and the corresponding actual travel time as historical travel data. A whole route feature corresponding to each historical travel route may include a real-time road condition feature and a route static feature introduced above. A real-time road condition feature corresponding to a certain historical travel route is a real-time road condition feature of a time that the historical traveling road condition is requested to be predicted, that is, a real-time road condition feature of the time that the server performs the step of obtaining the whole route feature corresponding to the historical travel route during a process of predicting the historical travel route.

In conclusion, according to the method provided in this embodiment, when an estimated travel time of a target travel route is predicted, in addition to a whole route feature corresponding to the target travel route, a prediction result is corrected by using historical travel data with reference to the historical travel data, so that accuracy of the prediction result obtained through calculation is increased. In addition, a corresponding whole route feature is directly obtained according to the target travel route that is a whole travel route, and section processing does not need to be performed on the target travel route, so that an accumulated error caused by a section accumulation may be avoided, thereby increasing accuracy of the prediction result.

In a possible implementation, a terminal obtains a travel time calculation model through training according to massive historical travel data. In addition, when a travel time prediction request is obtained, an estimated travel time of a target travel route is obtained through calculation by using the travel time calculation model. The following uses a schematic embodiment to describe training, verification and a use process of the travel time calculation model.

Figure 2A:
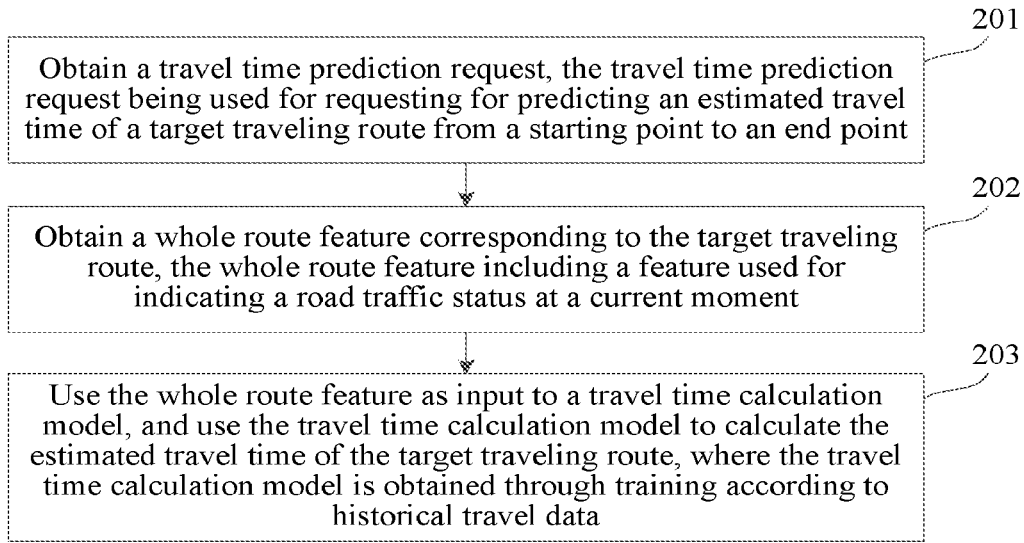
FIG. 2A is a flowchart of a travel time prediction method according to another embodiment of the present disclosure.

Referring to FIG. 2A, FIG. 2A shows a flowchart of a travel time prediction method according to another embodiment of this application. The method may include the following steps:

Step 201: Obtain a travel time prediction request, the travel time prediction request being used for requesting for predicting an estimated travel time of a target travel route from a starting point to an end point.

For step S201, reference may be made to the introduction and description of step 101, and details are not described herein again.

Step 202: Obtain a whole route feature corresponding to the target travel route, the whole route feature including a feature used for indicating a road traffic status at a current moment.

For step S202, reference may be made to the introduction and description of step 102, and details are not described herein again.

Step 203: Use the whole route feature as input to a travel time calculation model, and use the travel time calculation model to calculate the estimated travel time of the target travel route, where the travel time calculation model is obtained through training according to historical travel data.

The travel time calculation model is a mathematical model used for predicting a travel time of a travel route. In addition, input of the travel time calculation model is a whole route feature of the travel route, and output is an estimated travel time of the travel route. In this embodiment, during the process of training the travel time calculation model based on massive historical travel data, each feature item is fully considered, so that the travel time calculation model obtained through training can calculate the estimated travel time more accurately. Moreover, the estimated travel time is calculated by modeling, so that a calculation process is more direct and simple.

Figure 2B:
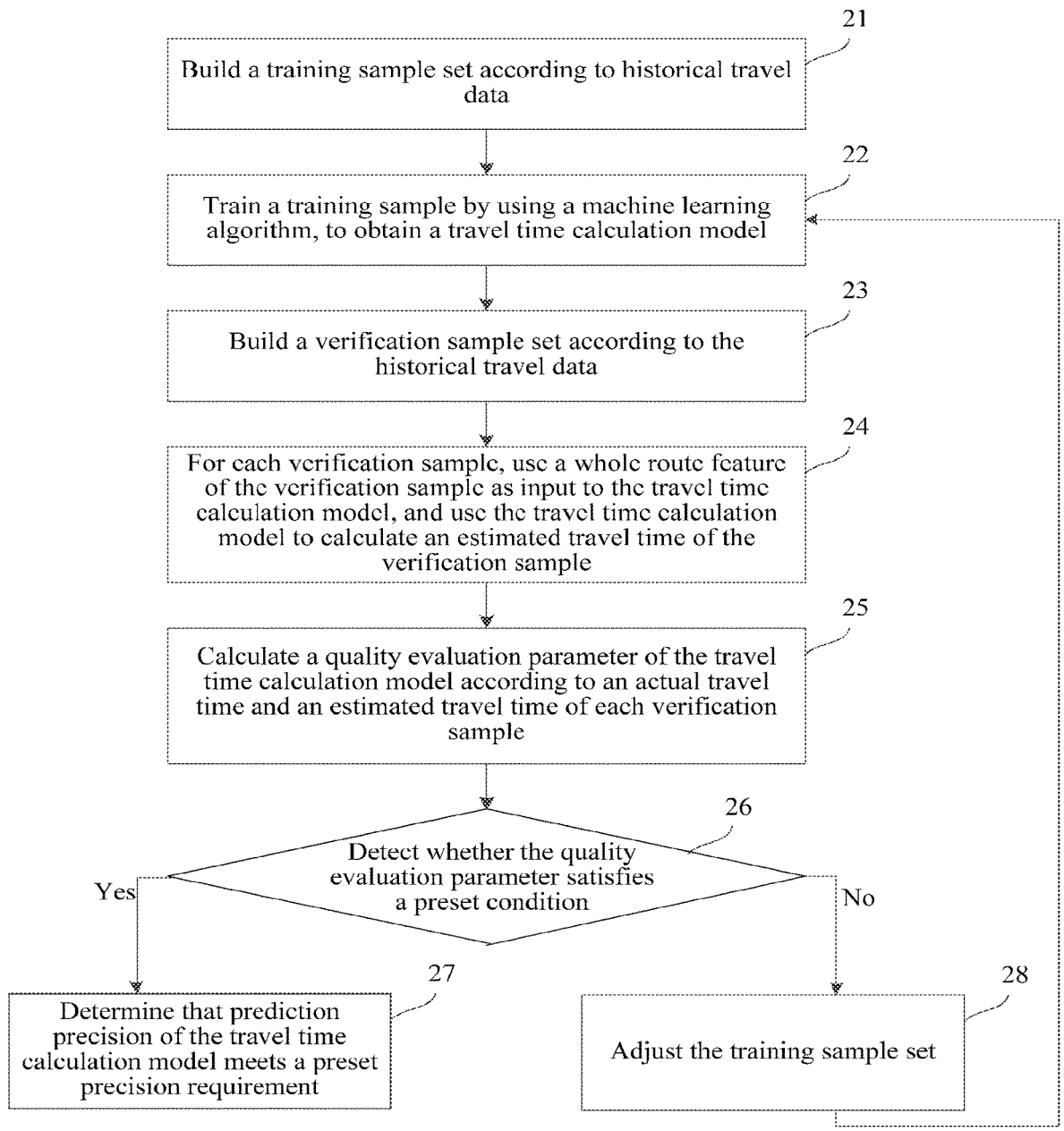
FIG. 2B is a flowchart of building a travel time calculation model included in the embodiment shown in FIG. 2A.

Optionally, as shown in FIG. 2B, the following step is used for obtaining a travel time calculation model:

Step 21: Build a training sample set according to historical travel data.

The training sample set includes multiple training samples, and each training sample includes: a whole route feature corresponding to a historical travel route and an actual travel time of the historical travel route.

Figure 2C:
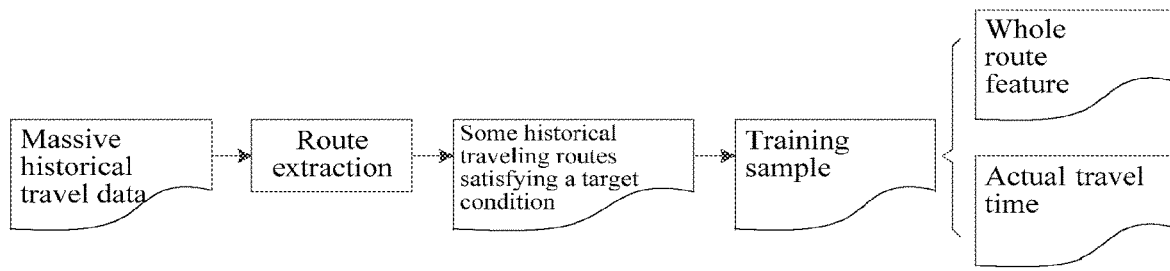
FIG. 2C is a schematic diagram of a building process of a training sample set included in the embodiment shown in FIG. 2A.

In an example, referring to FIG. 2C, FIG. 2C shows a schematic diagram of a building process of a training sample set. A server prepares massive historical travel data in advance; route extraction is performed on the massive historical travel data, to select some historical travel routes satisfying a target condition; for each selected historical travel route, a training sample is built according to a whole route feature corresponding to the historical travel route and an actual travel time of the historical travel route. To ensure a quality of the training sample, and to improve a quality of the travel time calculation model obtained through training, the target condition satisfied by the selected historical travel route includes but is not limited to at least one of the following: a total length of a travel route is relatively long, a feedback interval of a Global Positioning System (GPS) is small and stable and has no obvious jump and shift, or the travel route is mainly a high-grade road and has a low space-time coincidence degree. Optionally, a quantity of training samples in the training sample set is not less than ten percent of a total quantity of historical travel routes in the historical travel data.

Step 22: Train a training sample by using a machine learning algorithm, to obtain a travel time calculation model.

Optionally, the machine learning algorithm is a machine learning algorithm based on a regression decision tree. In an example, the machine learning algorithm based on the regression decision tree may be a Gradient Boosting Decision Tree (GBDT) algorithm. The GBDT algorithm is further referred to as a Multiple Additive Regression Tree (MART) algorithm and is an iterative decision tree algorithm. The algorithm is formed by multiple regression decision trees, and all calculation results of the regression decision trees are accumulated as an output value of a model. In this embodiment of this application, the quantity of training samples in the training sample set is relatively large, and the machine learning algorithm based on the regression decision tree is used, so that a model applicable to a travel time prediction can be built and trained.

In another possible implementation, the server uses another machine learning algorithm to train a training sample, such as a logistic regression algorithm, a random forest algorithm, a neural network algorithm, or a deep learning algorithm. In an actual application, an appropriate algorithm may be selected through an experiment. The machine learning algorithm based on the regression decision tree is an algorithm applicable to a travel time prediction.

Figure 2D:
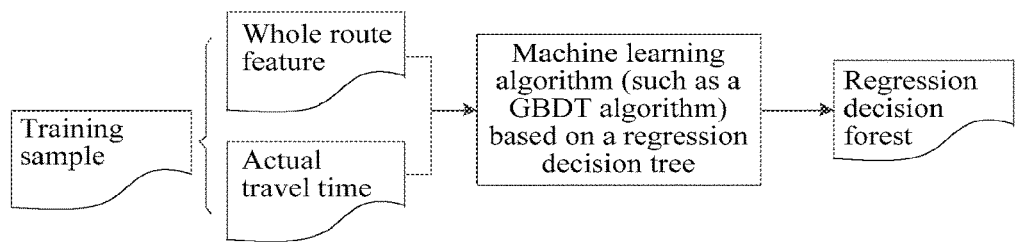
FIG. 2D is a schematic diagram of a model generation process included in the embodiment shown in FIG. 2A.

In an example, referring to FIG. 2D, FIG. 2D shows a schematic diagram of a model training process. In an example in which a machine learning algorithm is a machine learning algorithm (such as a GBDT algorithm) based on a regression decision tree, a whole route feature and an actual travel time included in a training sample are inputted to a travel time calculation model built based on the GBDT algorithm, and the model is trained, so that a regression decision forest is finally obtained. The regression decision forest includes multiple regression decision trees, and the regression decision forest is a travel time calculation model finally obtained through training.

Optionally, to ensure prediction precision of the travel time calculation model, the following steps are used to verify the travel time calculation model:

Step 23: Build a verification sample set according to the historical travel data.

The verification sample set includes multiple verification samples, and the verification samples are used for verifying a model. The verification sample may also be referred to as a test sample. Each verification sample includes: a whole route feature corresponding to a historical travel route and an actual travel time of the historical travel route. A feature item extracted when a verification sample is built is the same as a feature item extracted when a training sample is built.

For a manner of building the verification sample set, optionally, in the foregoing historical travel data prepared in advance, the server performs route extraction on historical travel data excluding the training samples, to obtain the verification sample set. Optionally, a quantity of verification samples is not less than ten percent of a total quantity of historical travel routes in the historical travel data.

Optionally, a training sample selected by the server satisfies a target condition included in step 201, so that low-quality training samples are prevented from causing a counter effect to a subsequent adjustment of the travel time calculation model.

Step 24: For each verification sample, use a whole route feature of the verification sample as input to the travel time calculation model, and use the travel time calculation model to calculate an estimated travel time of the verification sample.

To quantize prediction precision of the travel time calculation model obtained through training, the server inputs a whole route feature of each verification sample to the travel time calculation model, so that the travel time calculation model outputs an estimated travel time corresponding to the verification sample, and the prediction precision of the model is quantized according to the estimated travel time and an actual travel time of the verification sample.

Step 25: Calculate a quality evaluation parameter of the travel time calculation model according to an actual travel time and an estimated travel time of each verification sample.

The quality evaluation parameter is used for indicating prediction precision of the travel time calculation model. In addition, a preset condition is set according to the quality evaluation parameter, and the preset condition is used for determining whether the prediction precision of the model meets a preset precision requirement. If the quality evaluation parameter satisfies the preset condition, it indicates that the prediction precision of the model meets the preset precision requirement; if the quality evaluation parameter does not satisfy the preset condition, it indicates that the prediction precision of the model does not meet the preset precision requirement.

In a possible implementation, the quality evaluation parameter may be an error rate of a model, an accuracy rate, or the like. In an example, this step includes the following two substeps: 1. For each verification sample, calculate an error rate according to an actual travel time of the verification sample and an estimated travel time. 2. Obtain a ratio of a quantity of verification samples whose error rates are less than a first threshold to a total quantity of the verification samples, and the ratio is the quality evaluation parameter, for example, the first threshold is 10%.

For example, the error rate is the quotient of an absolute value of a difference of the actual travel time of the verification sample and the estimated travel time divided by the actual travel time of the verification sample and is obtained by the server. That is, the error rate=|the actual travel time of the verification sample−the estimated travel time of the verification sample|/the actual travel time of the verification sample.

Step 26: Detect whether the quality evaluation parameter satisfies a preset condition. If yes, the following step 27 is performed; or if not, the following step 28 is performed.

In a possible implementation, when the quality evaluation parameter is a ratio obtained through calculation in the foregoing step 25, the server detects whether the ratio is greater than a second threshold, and if the ratio is greater than the second threshold, the following step 27 is performed, or if the ratio is less than the second threshold, the following step 28 is performed. For example, the second threshold is 0.90.

Step 27: Determine that prediction precision of the travel time calculation model meets a preset precision requirement.

If the quality evaluation parameter is greater than a second threshold, the server determines that the travel time calculation model obtained through training meets the preset precision requirement, so that the travel time calculation model is used for predicting travel time.

Step 28: Adjust the training sample set. Steps are started to be performed again from step 22 after step 28 is performed.

Optionally, a manner of adjusting the training sample set includes: adjusting an obtained feature item and/or adjusting a training sample. For example, based on original feature items, the server may further increase the feature items, especially some feature items having relatively strong relevance to a travel time. For another example, the server further increases a training sample quantity, and uses more training samples to perform training.

Figure 2E:
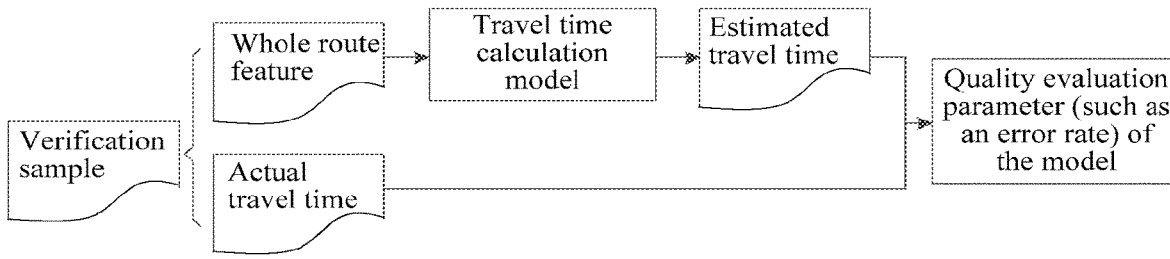
FIG. 2E is a schematic diagram of a model verification process included in the embodiment shown in FIG. 2A.

In an example, referring to FIG. 2E, FIG. 2E shows a schematic diagram of a model verification process. Each verification sample includes: a whole route feature corresponding to a historical travel route and an actual travel time of the historical travel route. The whole route feature of the verification sample is used as input to a travel time calculation model, to calculate an estimated travel time of the verification sample. Afterwards, a quality evaluation parameter (such as an error rate) of the model is calculated according to an actual travel time of each verification sample.

A travel time calculation model whose verification result is that prediction precision has met a preset precision requirement can be used for predicting a travel time of a target travel route. In this embodiment of this application, the model is verified by using the verification sample. This helps improving the prediction precision and stability of the model, so that accuracy of the estimated travel time of the target travel route is increased.

In conclusion, in the method according to this embodiment, the travel time calculation model is obtained through training according to the historical travel data, and each feature item can be fully considered, so that the obtained travel time calculation model can more accurately calculate an estimated travel time. Moreover, the estimated travel time is calculated by modeling, so that a calculation process is more direct and simple.

In an example, when an actual application scenario is for an arrival moment prediction, after the foregoing step 103 or 203 is performed, the step further includes: calculating an estimated arrival moment according to a planned departure moment and the estimated travel time corresponding to the target travel route, where the estimated arrival moment=the planned departure moment+the estimated travel time.

In a possible implementation, in this scenario, in a process of training and verification the travel time calculation model, an actual departure moment corresponding to the historical travel route, or a time period (for example, 11:00 to 12:00) corresponding to the actual departure moment and/or a date (for example, Monday) is used as a feature item, to further improve prediction accuracy of the travel time calculation model. Correspondingly, in the prediction process, an estimated departure moment corresponding to the target travel route, or a time period and/or a date corresponding to the estimated departure moment is used as one feature. The foregoing manner is used, to implement a prediction of an arrival moment.

In another example, when an actual application scenario is a recommendation of a departure moment, after the foregoing step 103 or 203 is performed, the step further includes: calculating an estimated departure moment according to a planned arrival moment and the estimated travel time corresponding to the target travel route, where the estimated departure moment=the planned arrival moment+the estimated travel time.

In a possible implementation, in this scenario, in a training and verification process, an actual arrival moment corresponding to the historical travel route, or a time period (for example, 11:00 to 12:00) corresponding to the actual arrival moment and/or a date (for example, Monday) is used as a feature item, to further improve prediction accuracy of the travel time calculation model. Correspondingly, in the prediction process, an estimated arrival moment corresponding to the target travel route, or a time period and/or a date corresponding to the estimated arrival moment is used as one feature. The foregoing manner is used, to implement a recommendation of a departure moment.

The technical solutions provided in this embodiment of this application, for an individual user, a more accurate estimated travel time is provided, so that a user conveniently selects a best travel route or arranges a best travel time. This helps the user to save time costs of a travel and economy costs. For an enterprise user such as a taxi-hailing platform or a takeaway platform, a more accurate travel time prediction may increase accuracy of order assignment, so that a dealing rate of each order is increased.

It should be additionally noted that, to further increase accuracy of the estimated travel time obtained through calculation, before step 103 is performed, the server may further perform transform processing on the whole route feature corresponding to the target travel route, to obtain processed whole route feature. For different feature items, the performed transform processing may be the same, or may be different. In this embodiment of this application, it is not limited to a specific manner of transform processing, for example, take a logarithm, round a number, or multiply a preset coefficient. In an actual application, a manner of transform processing on a feature item may be verified and determined through an experiment. The server calculates the estimated travel time of the target travel route according to the processed whole route feature and the historical travel route. For example, the server uses the processed whole route feature as input to the travel time calculation model and uses the travel time calculation model to calculate an estimated travel time of the target travel route. In addition, if the travel time calculation model is used for predicting a travel time, in a process of model building, transform processing needs to be performed on the whole route feature corresponding to the historical travel route.

The following is apparatus embodiments of the present disclosure and the apparatus embodiments can be used for executing the method embodiments of the present disclosure. For details not disclosed in the apparatus embodiments of the present disclosure, refer to the method embodiments of the present disclosure.

Figure 3:
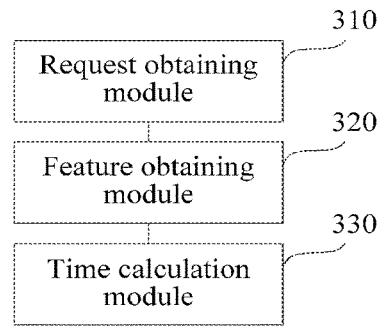
FIG. 3 is a block diagram of a travel time prediction apparatus according to an embodiment of the present disclosure.

Referring to FIG. 3, FIG. 3 shows a block diagram of a travel time prediction apparatus according to an embodiment of the present disclosure. The apparatus has a function of implementing the foregoing method examples, and the function may be implemented through hardware, or may be implemented in such a manner that the hardware executes related software. The apparatus may include: a request obtaining module 310, a feature obtaining module 320, and a time calculation module 330.

The request obtaining module 310 is configured to perform the foregoing step 101 or step 201.

The feature obtaining module 320 is configured to perform the foregoing step 102 or step 202.

The time calculation module 330 is configured to perform step 103 or step 203.

Optionally, the apparatus further includes: a first building module and a model training module.

The first building module is configured to perform the foregoing step 21.

The model training module is configured to perform the foregoing step 22.

Optionally, the apparatus further includes: a second building module, a first calculation module, a second calculation module, a parameter detection module, and a sample adjustment module.

The second building module is configured to perform the foregoing step 23.

The first calculation module is configured to perform the foregoing step 24.

The second calculation module is configured to perform the foregoing step 25.

The parameter detection module is configured to perform the foregoing step 26.

The sample adjustment module is configured to perform the foregoing step 28.

The model training module is further configured to: after a training sample set is adjusted, perform again the foregoing step 22.

Optionally, the second calculation module includes: an error calculation unit and a ratio obtaining unit. The error calculation unit is configured to: for each verification sample, calculate an error rate according to an actual travel time of the verification sample and an estimated travel time. The ratio obtaining unit is configured to obtain a ratio of a quantity of verification samples whose error rates are less than a first threshold to a total quantity of the verification samples, where the ratio is the quality evaluation parameter. The preset condition includes that the ratio is greater than a second threshold.

Optionally, the apparatus further includes: a feature processing module. The feature processing module is configured to perform transform processing on the whole route feature, to obtain a processed whole route feature. The time calculation module 330 is configured to calculate an estimated travel time of a target travel route according to a processed whole route feature corresponding to the target travel route and historical travel data.

Optionally, the apparatus further includes: an arrival estimation module or a departure estimation module. The arrival estimation module is configured to calculate an estimated arrival moment according to a planned departure moment and the estimated travel time corresponding to the target travel route. The departure estimation module is configured to calculate an estimated departure moment according to the planned arrival moment and the estimated travel time corresponding to the target travel route.

Related details may be referred to the foregoing method embodiment.

It should be noted that, when the apparatus provided in the foregoing embodiment implements functions of the apparatus, it is illustrated with an example of division of each function module. In the practical application, the function distribution may be finished by different function modules according to the requirements, that is, divide the internal structure of the equipment into different function modules, so as to finish all or part of the functions described above. Besides, the apparatus provided in the foregoing embodiment and the embodiments of the methods belong to one concept. For the specific implementing procedure, refer to the method embodiments, and no further details are provided herein.

Figure 4:
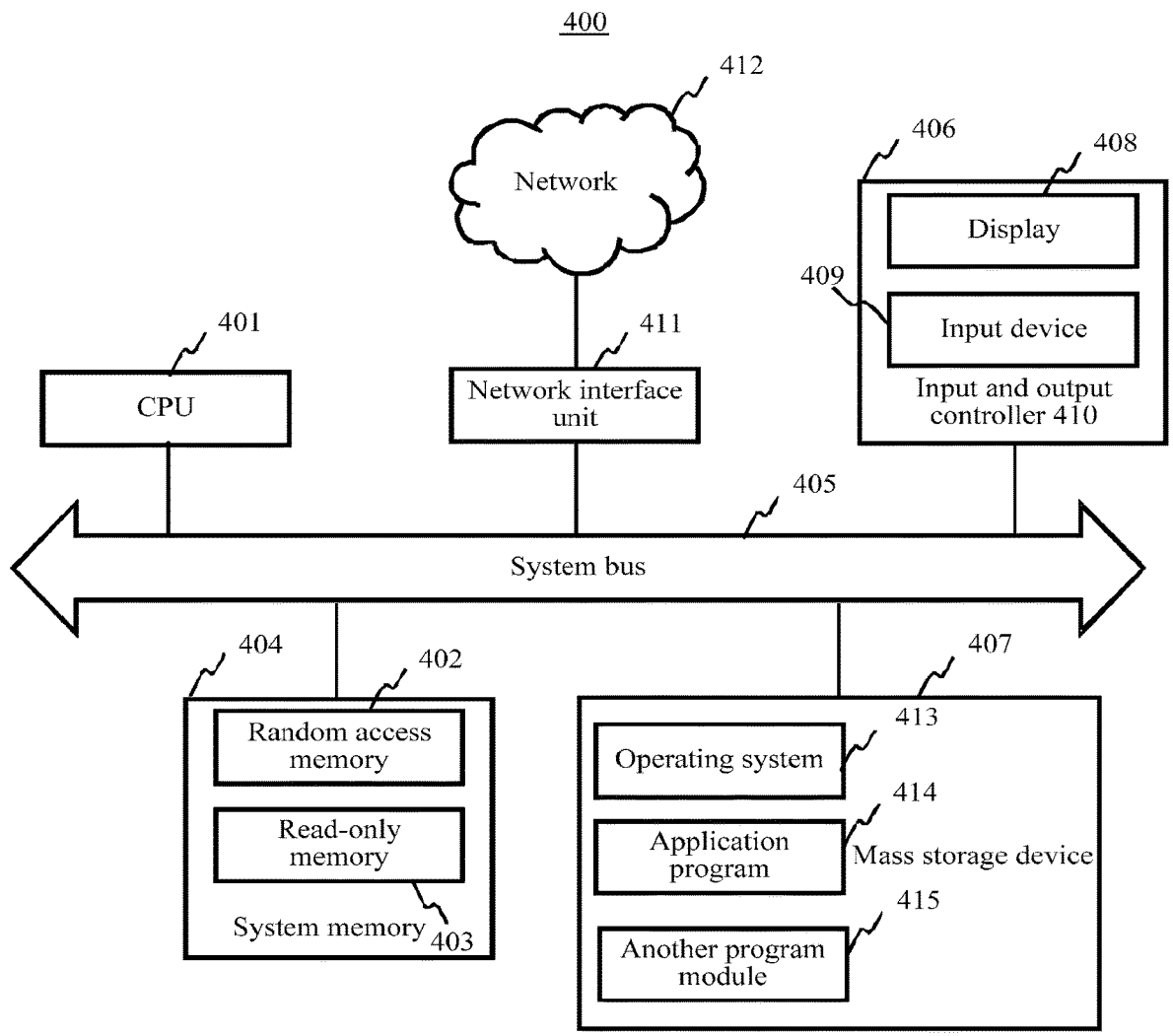
FIG. 4 shows a schematic structural diagram of a server according to an embodiment of the present disclosure.

FIG. 4 shows a schematic structural diagram of a server according to an embodiment of the present disclosure. The server is configured to implement the method provided in the foregoing embodiments. For example:

The server 400 includes a central processing unit (CPU) 401, a system memory 404 including a random access memory (RAM) 402 and a read-only memory (ROM) 403, and a system bus 405 connecting the system memory 404 and the CPU 401. The server 400 further includes a basic input/output system (I/O system) 406 configured to transmit information between components in a computer, and a mass storage device 407 configured to store an operating system 413, an application program 414, and another program module 415.

The basic I/O system 406 includes a display 408 configured to display information, and an input device 409 configured to input information by a user, such as a mouse and a keyboard. The display 408 and the input device 409 are both connected to the CPU 401 by being connected to an input and output controller 410 of the system bus 405. The basic I/O system 406 may further include the input and output controller 410, so as to receive and process input from multiple other devices such as a keyboard, a mouse, or an electronic stylus. Similarly, the input and output controller 410 further provides output to a display screen, a printer, or other types of output device.

The large-capacity storage device 407 is connected to the CPU 401 by being connected to a large-capacity storage controller (not shown) of the system bus 405. The mass storage device 407 and an associated computer readable medium provide non-volatile storage to the server 400. That is, the large-capacity storage device 407 may include a computer readable medium (not shown) such as a hard disk or a CD-ROM.

Without loss of generality, the computer readable medium may include a computer storage medium and a communication medium. The computer storage medium includes volatile and non-volatile media, and removable and non-removable media implemented by using any method or technology used for storing information such as a computer readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing types. The system memory 404 and the large-capacity storage device 407 may be collectively referred to as a storage.

According to the embodiments of the present disclosure, the server 400 may further be connected to a remote computer on a network through a network, such as Internet. That is, the server 400 may be connected to the network 412 by being connected to a network interface unit 411 on the system bus 405, or, may be connected to a network of another type or a remote computer system (not shown) by using the network interface unit 411.

The storage further includes one or more programs. The one or more programs are stored in the storage and configured to be executed by one or more processors. The one or more programs include an instruction used for executing the foregoing method. For example, in this embodiment, the storage stores at least one instruction, at least one program, a code set or an instruction set. The at least one instruction, at least one program, a code set or an instruction set is loaded and executed by a processor to implement the travel time prediction method in all the foregoing method embodiments.

In an exemplary embodiment, a non-transitory computer readable storage medium including an instruction, for example, a memory including an instruction, is further provided. The instruction may be executed by a processor of a terminal to implement all steps in the foregoing method embodiments. For example, the non-transitory computer readable storage medium may be a ROM, a random access memory (RAM), a CD-ROM, a magnetic tape, a floppy disk, or an optical data storage device.

It should be understood that, "multiple" mentioned in this specification means two or more than two. "And/or" is an association relationship for describing the associated objects, and represents that three relationships may exist, for example, A and/or B may represent the following three cases: A exists separately, and both A and B exist, and B exists separately. The character "/" usually represents that the former and later associated objects are in a "or" relationship.

The sequence numbers of the preceding embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like. Alternatively, the storage medium stores at least one instruction, at least one program, a code set or an instruction set, and the at least one instruction, at least one program, a code set or an instruction set is loaded and executed by the processor to implement the travel time prediction method described in all the foregoing method embodiments.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for estimating travel time, comprising:
  obtaining, via interface circuitry of an information processing apparatus, a request to estimate the travel time of a target travel route from a starting point to an end point;
  obtaining, via the interface circuitry, road traffic information along the target travel route at a current time; and
  calculating, by processing circuitry of the information processing apparatus, the estimated travel time of the target travel route based on a travel time calculation model according to the obtained road traffic information and historical travel data, the historical travel data including a plurality of historical travel routes, respective road traffic information for each of the plurality of historical travel routes, and a respective actual travel time of each of the plurality of historical travel routes, wherein:
  the travel time calculation model is obtained by training a machine learning algorithm with a plurality of training samples from the historical travel data,
  the travel time calculation model is verified by inputting a plurality of verification samples from the historical travel data into the travel time calculation model to calculate a quality evaluation parameter of the travel time calculation model, the quality evaluation parameter is calculated based on differences between actual travel times of the historical travel routes associated with the plurality of verification samples and corresponding estimated travel times of the historical travel routes associated with the plurality of verification samples that are obtained through the travel time calculation model, and the travel time calculation model is verified based on the quality evaluation parameter being equal to or larger than a preset value.

2. The method according to claim 1, wherein the calculating includes feeding the road traffic information as an input to the travel time calculation model, and applying the travel time calculation model to calculate the estimated travel time of the target travel route.

3. The method according to claim 2, further comprising:

building the plurality of training samples based on the historical travel data, each of the plurality of training samples including a first one of the plurality of historical travel routes, the road traffic information for the first one of the plurality of historical travel routes, and an actual travel time of the first one of the plurality of historical travel routes.

4. The method according to claim 3, further comprising:

building the plurality of verification samples based on the historical travel data, each of the plurality of verification samples including a second one of the plurality of historical travel routes, the road traffic information for the second one of the plurality of historical travel routes, and an actual travel time of the second one of the plurality of historical travel routes, and the plurality of verification samples are different from the plurality of training samples;

for each of the plurality of verification samples, feeding the respective road traffic information for the respective verification sample as an input to the travel time calculation model, and applying the travel time calculation model to calculate a respective estimated travel time of the respective verification sample;

calculating the quality evaluation parameter of the travel time calculation model based on the respective actual travel time and the respective estimated travel time of each of the plurality of the verification samples, the quality evaluation parameter indicating a prediction accuracy of the travel time calculation model;

detecting whether the quality evaluation parameter is equal to or larger than the preset value; and adjusting the plurality of training samples when the quality evaluation parameter is smaller than the preset value, and training the adjusted plurality of training samples by using the machine learning algorithm to obtain another travel time calculation model.

5. The method according to claim 4, wherein the calculating the quality evaluation parameter comprises:

for each of the plurality of the verification samples, calculating an error rate based on the respective actual travel time and the respective estimated travel time of the respective verification sample; and obtaining a ratio between a number of the plurality of verification samples that have error rates less than a first threshold value and a total number of the plurality of verification samples, and defining the ratio as the quality evaluation parameter.

6. The method according to claim 1, further comprising:

performing transformation processing on the road traffic information, and obtaining processed road traffic information; and the calculating includes calculating the estimated travel time of the target travel route according to the processed road traffic information and the historical travel data.

7. The method according to claim 1, further comprising:

calculating an estimated arrival moment based on a planned departure moment and the estimated travel time of the target travel route.

8. The method according to claim 1, further comprising:

calculating an estimated departure moment based on a planned arrival moment and the estimated travel time of the target travel route.

9. The method according to claim 1, further comprising:

calculating the estimated travel time of the target travel route without separately estimating travel times of a plurality of different roads along the target travel route.

10. An information processing apparatus, comprising:

interface circuitry configured to obtain a request to estimate a travel time of a target travel route from a starting point to an end point, and obtain road traffic information along the target travel route at a current time; and processing circuitry configured to calculate the estimated travel time of the target travel route based on a travel time calculation model according to the obtained road traffic information and historical travel data, the historical travel data including a plurality of historical travel routes, respective road traffic information for each of the plurality of historical travel routes, and a respective actual travel time of each of the plurality of historical travel routes, wherein:

the travel time calculation model is obtained by training a machine learning algorithm with a plurality of training samples from the historical travel data, the travel time calculation model is verified by inputting a plurality of verification samples from the historical travel data into the travel time calculation model to calculate a quality evaluation parameter of the travel time calculation model, the quality evaluation parameter is calculated based on differences between actual travel times of the historical travel routes associated with the plurality of verification samples and corresponding estimated travel times of the historical travel routes associated with the plurality of verification samples that are obtained through the travel time calculation model, and the travel time calculation model is verified based on the quality evaluation parameter being equal to or larger than a preset value.

11. The information processing apparatus according to claim 10, wherein the processing circuitry is configured to feed the road traffic information as an input to the travel time calculation model, and apply the travel time calculation model to calculate the estimated travel time of the target travel route.

12. The information processing apparatus according to claim 11, wherein the processing circuitry is configured to build the plurality of training samples based on the historical travel data, each of the plurality of training samples including a first one of the plurality of historical travel routes, the road traffic information for the first one of the plurality of historical travel routes, and an actual travel time of the first one of the plurality of historical travel routes.

13. The information processing apparatus according to claim 12, wherein the processing circuitry is configured to
build the plurality of verification samples based on the historical travel data, each of the plurality of verification samples including a second one of the plurality of historical travel routes, the road traffic information for the second one of the plurality of historical travel routes, and an actual travel time of the second one of the plurality of historical travel routes, and the plurality of verification samples are different from the plurality of training samples;
for each of the plurality of verification samples, feed the respective road traffic information for the respective verification sample as an input to the travel time calculation model, and apply the travel time calculation model to calculate a respective estimated travel time of the respective verification sample;
calculate the quality evaluation parameter of the travel time calculation model based on the respective actual travel time and the respective estimated travel time of each of the plurality of the verification samples, the quality evaluation parameter indicating a prediction accuracy of the travel time calculation model;
detect whether the quality evaluation parameter is equal to or larger than the preset value; and
adjust the plurality of training samples when the quality evaluation parameter is smaller than the preset value, and train the adjusted plurality of training samples by using the machine learning algorithm to obtain another travel time calculation model.

14. The information processing apparatus according to claim 13, wherein the processing circuitry is configured to
for each of the plurality of the verification samples, calculate an error rate based on the respective actual travel time and the respective estimated travel time of the respective verification sample; and
obtain a ratio between a number of the plurality of verification samples that have error rates less than a first threshold value and a total number of the plurality of verification samples, and define the ratio as the quality evaluation parameter.

15. The information processing apparatus according to claim 10, wherein the processing circuitry is configured to
perform transformation processing on the road traffic information, and obtain processed road traffic information; and
calculate the estimated travel time of the target travel route according to the processed road traffic information and the historical travel data.

16. The information processing apparatus according to claim 10, wherein the processing circuitry is configured to calculate an estimated arrival moment based on a planned departure moment and the estimated travel time of the target travel route.

17. The information processing apparatus according to claim 10, wherein the processing circuitry is configured to calculate an estimated departure moment based on a planned arrival moment and the estimated travel time of the target travel route.

18. The information processing apparatus according to claim 10, wherein the processing circuitry is configured to calculate the estimated travel time of the target travel route without separately estimating travel times of a plurality of different roads along the target travel route.

19. A non-transitory computer readable storage medium storing instructions which when executed by at least one processor cause the at least one processor to perform:
obtaining a request to estimate a travel time of a target travel route from a starting point to an end point;
obtaining road traffic information along the target travel route at a current time; and
calculating the estimated travel time of the target travel route based on a travel time calculation model according to the obtained road traffic information and historical travel data, the historical travel data including a plurality of historical travel routes, respective road traffic information for each of the plurality of historical travel routes, and a respective actual travel time of each of the plurality of historical travel routes, wherein:
the travel time calculation model is obtained by training a machine learning algorithm with a plurality of training samples from the historical travel data,
the travel time calculation model is verified by inputting a plurality of verification samples from the historical travel data into the travel time calculation model to calculate a quality evaluation parameter of the travel time calculation model,
the quality evaluation parameter is calculated based on differences between actual travel times of the historical travel routes associated with the plurality of verification samples and corresponding estimated travel times of the historical travel routes associated with the plurality of verification samples that are obtained through the travel time calculation model, and
the travel time calculation model is verified based on the quality evaluation parameter being equal to or larger than a preset value.

20. The non-transitory computer readable storage medium according to claim 19, wherein the calculating includes
feeding the road traffic information as an input to the travel time calculation model, and
applying the travel time calculation model to calculate the estimated travel time of the target travel route.

* * * * *